US009430042B2

(12) United States Patent
Levin

(10) Patent No.: US 9,430,042 B2
(45) Date of Patent: Aug. 30, 2016

(54) VIRTUAL DETENTS THROUGH VIBROTACTILE FEEDBACK

(75) Inventor: Michael D. Levin, Los Altos, CA (US)

(73) Assignee: Immersion Corporation, San Jose, CA (US)

( * ) Notice: Subject to any disclaimer, the term of this patent is extended or adjusted under 35 U.S.C. 154(b) by 1796 days.

(21) Appl. No.: 11/965,046

(22) Filed: Dec. 27, 2007

(65) Prior Publication Data

US 2008/0158149 A1 Jul. 3, 2008

Related U.S. Application Data

(60) Provisional application No. 60/877,333, filed on Dec. 27, 2006.

(51) Int. Cl.
*G09G 5/00* (2006.01)
*G06F 3/01* (2006.01)

(52) U.S. Cl.
CPC ..................................... *G06F 3/016* (2013.01)

(58) Field of Classification Search
CPC ......................................................... G06F 3/016
USPC .................................................. 345/156–179
See application file for complete search history.

(56) References Cited

U.S. PATENT DOCUMENTS

| | | |
|---|---|---|
| 3,618,070 A | 11/1971 | Kagan |
| 3,911,416 A | 10/1975 | Feder |
| 4,028,502 A | 6/1977 | Moricca et al. |
| 4,127,752 A | 11/1978 | Lowthorp |
| 4,227,319 A | 10/1980 | Guy et al. |
| 4,262,549 A | 4/1981 | Schwellenbach |
| 4,278,920 A | 7/1981 | Ruoff, Jr. |
| 4,333,070 A | 6/1982 | Barnes |
| 4,352,091 A | 9/1982 | Yamasaki |
| 4,421,953 A | 12/1983 | Zielinski |
| 4,436,188 A | 3/1984 | Jones |
| 4,464,117 A | 8/1984 | Foerst |
| 4,484,191 A | 11/1984 | Vavra |
| 4,581,972 A | 4/1986 | Hoshino |

(Continued)

FOREIGN PATENT DOCUMENTS

| | | |
|---|---|---|
| JP | 3085481 | 5/2002 |
| JP | 2003-29914 | 1/2003 |

(Continued)

OTHER PUBLICATIONS

Curry, K., Supporting Collaborative Interaction in Tele-immersion, Thesis submitted to the Faculty of the Virginia Polytechnic Institute and the State University in partial fulfillment of the requirements for the degree of Master of Science in Computer Science and Applications, 1998.

(Continued)

*Primary Examiner* — Amare Mengistu
*Assistant Examiner* — Jennifer Zubajlo
(74) *Attorney, Agent, or Firm* — Kilpatrick Townsend & Stockton LLP

(57) ABSTRACT

Systems and methods for virtual detents through vibrotactile feedback are described. One described method includes receiving an input signal comprising information associated with the manipulation of an input device and generating a signal configured to cause an actuator to provide a vibrotactile effect to the input device, the vibrotactile effect comprising a virtual detent.

19 Claims, 10 Drawing Sheets

(56) References Cited

U.S. PATENT DOCUMENTS

| | | |
|---|---|---|
| 4,603,284 A | 7/1986 | Perzley |
| 4,692,756 A | 9/1987 | Clark |
| 4,782,327 A | 11/1988 | Kley et al. |
| 4,791,416 A | 12/1988 | Adler |
| 4,794,392 A | 12/1988 | Selinko |
| 4,798,919 A | 1/1989 | Miessler et al. |
| 4,821,030 A | 4/1989 | Batson et al. |
| 4,823,634 A | 4/1989 | Culver |
| 4,853,674 A | 8/1989 | Kiss |
| 4,918,438 A | 4/1990 | Yamasaki |
| 4,931,765 A | 6/1990 | Rollins et al. |
| 4,964,004 A | 10/1990 | Barker |
| 4,983,786 A | 1/1991 | Stevens et al. |
| 5,003,984 A | 4/1991 | Muraki et al. |
| 5,053,585 A | 10/1991 | Yaniger |
| 5,086,296 A | 2/1992 | Clark |
| 5,117,449 A | 5/1992 | Metroka et al. |
| 5,165,897 A | 11/1992 | Johnson |
| 5,175,459 A | 12/1992 | Danial et al. |
| 5,189,389 A | 2/1993 | DeLuca et al. |
| 5,237,327 A | 8/1993 | Saitoh et al. |
| 5,241,308 A | 8/1993 | Young |
| 5,283,970 A | 2/1994 | Aigner |
| 5,293,158 A | 3/1994 | Soma |
| 5,355,148 A | 10/1994 | Anderson |
| 5,366,376 A | 11/1994 | Copperman et al. |
| 5,368,484 A | 11/1994 | Copperman et al. |
| 5,414,337 A | 5/1995 | Schuler |
| 5,436,622 A | 7/1995 | Gutman et al. |
| 5,437,607 A | 8/1995 | Taylor |
| 5,459,382 A | 10/1995 | Jacobus et al. |
| 5,482,051 A | 1/1996 | Reddy et al. |
| 5,489,812 A | 2/1996 | Furuhata et al. |
| 5,496,174 A | 3/1996 | Garner |
| 5,506,605 A | 4/1996 | Paley |
| 5,508,688 A | 4/1996 | Mochizuki |
| 5,521,336 A | 5/1996 | Buchanan et al. |
| 5,575,761 A | 11/1996 | Hajianpour |
| 5,619,181 A | 4/1997 | Murray |
| 5,625,576 A | 4/1997 | Massie et al. |
| 5,642,413 A | 6/1997 | Little |
| 5,646,589 A | 7/1997 | Murray et al. |
| 5,666,473 A | 9/1997 | Wallace |
| 5,692,956 A | 12/1997 | Rifkin |
| 5,696,497 A | 12/1997 | Mottier et al. |
| 5,729,249 A | 3/1998 | Yasutake |
| 5,729,589 A | 3/1998 | Samson |
| 5,754,096 A | 5/1998 | Muto et al. |
| 5,757,280 A | 5/1998 | Motohashi |
| 5,764,751 A | 6/1998 | Konishi |
| 5,767,457 A | 6/1998 | Gerpheide et al. |
| 5,767,787 A | 6/1998 | Kudoh et al. |
| 5,816,823 A | 10/1998 | Naimark et al. |
| 5,844,392 A | 12/1998 | Peurach et al. |
| 5,844,498 A | 12/1998 | Ide |
| 5,867,796 A | 2/1999 | Inutsuka |
| 5,873,024 A | 2/1999 | Suzuki |
| 5,887,995 A | 3/1999 | Holehan |
| 5,889,670 A | 3/1999 | Schuler et al. |
| 5,917,906 A | 6/1999 | Thorton |
| 5,943,044 A | 8/1999 | Martinelli et al. |
| 5,955,964 A | 9/1999 | Tada |
| 5,956,484 A | 9/1999 | Rosenberg et al. |
| 5,966,655 A | 10/1999 | Hardouin |
| 5,973,689 A | 10/1999 | Gallery |
| 5,988,902 A | 11/1999 | Holehan |
| 6,014,572 A | 1/2000 | Takahashi |
| 6,046,726 A | 4/2000 | Keyson |
| 6,091,321 A | 7/2000 | Karell |
| 6,113,459 A | 9/2000 | Nammoto |
| 6,118,979 A | 9/2000 | Powell |
| 6,128,006 A | 10/2000 | Rosenberg et al. |
| 6,131,097 A | 10/2000 | Peurach et al. |
| 6,175,721 B1 | 1/2001 | Hayato |
| 6,218,958 B1 | 4/2001 | Eichstaedt et al. |
| 6,218,966 B1 | 4/2001 | Goodwin et al. |
| 6,225,976 B1 | 5/2001 | Yates et al. |
| 6,272,319 B1 | 8/2001 | Narusawa |
| 6,300,938 B1 | 10/2001 | Culver |
| 6,307,465 B1 | 10/2001 | Kayama et al. |
| 6,373,463 B1 | 4/2002 | Beeks |
| 6,374,255 B1 | 4/2002 | Peurach et al. |
| 6,418,323 B1 | 7/2002 | Bright et al. |
| 6,424,251 B1 | 7/2002 | Byrne |
| 6,433,771 B1 | 8/2002 | Yocum et al. |
| 6,448,977 B1 | 9/2002 | Braun et al. |
| 6,563,487 B2 | 5/2003 | Martin et al. |
| 6,574,489 B1 | 6/2003 | Uriya |
| 6,650,338 B1 | 11/2003 | Kolarov et al. |
| 6,686,901 B2 | 2/2004 | Rosenberg |
| 6,686,911 B1 | 2/2004 | Levin et al. |
| 6,819,312 B2 | 11/2004 | Fish |
| 6,864,877 B2 | 3/2005 | Braun et al. |
| 6,876,891 B1 | 4/2005 | Schuler et al. |
| 6,917,867 B2 * | 7/2005 | Huang ............... G06F 3/016 345/156 |
| 7,215,320 B2 | 5/2007 | Takeuchi et al. |
| 7,720,552 B1 * | 5/2010 | Lloyd ............... G05B 19/106 345/156 |
| 2002/0145512 A1 | 10/2002 | Sleichter, III et al. |
| 2002/0149561 A1 | 10/2002 | Fukumoto et al. |
| 2003/0018835 A1 | 1/2003 | Nonaka |
| 2003/0030619 A1 | 2/2003 | Martin et al. |
| 2003/0090460 A1 | 5/2003 | Schena et al. |
| 2003/0122658 A1 | 7/2003 | Takahashi |
| 2003/0169151 A1 | 9/2003 | Ebling et al. |
| 2003/0188594 A1 | 10/2003 | Levin et al. |
| 2003/0222766 A1 | 12/2003 | Rollins et al. |
| 2004/0014484 A1 | 1/2004 | Kawashima |
| 2004/0056840 A1 | 3/2004 | Goldenberg et al. |
| 2004/0178989 A1 * | 9/2004 | Shahoian ............... G06F 3/016 345/156 |
| 2004/0204811 A1 * | 10/2004 | Huang ............... G06F 3/016 701/50 |
| 2005/0093847 A1 | 5/2005 | Altkorn et al. |
| 2005/0109145 A1 | 5/2005 | Levin et al. |
| 2005/0151720 A1 | 7/2005 | Cruz-Hernandez et al. |
| 2005/0162383 A1 | 7/2005 | Rosenberg |
| 2005/0231466 A1 | 10/2005 | Tada |
| 2006/0038781 A1 | 2/2006 | Levin |
| 2006/0119573 A1 * | 6/2006 | Grant ............... G06F 3/016 345/156 |
| 2006/0187216 A1 * | 8/2006 | Trent ............... G06F 3/03547 345/173 |
| 2007/0222765 A1 * | 9/2007 | Nyyssonen ............ G06F 1/1607 345/173 |

FOREIGN PATENT DOCUMENTS

| | | |
|---|---|---|
| JP | 2003-084901 | 3/2003 |
| JP | 2003-153354 | 5/2003 |
| JP | 2003-295959 | 10/2003 |
| JP | 2004-094570 | 3/2004 |
| JP | 2004-171157 | 6/2004 |
| JP | 2005-71157 | 3/2005 |
| JP | 2005-267080 | 9/2005 |
| JP | 2006-163206 | 6/2006 |
| JP | 2006-251845 | 9/2006 |
| JP | 2008-016426 | 1/2008 |
| JP | 2008-508600 B | 3/2008 |
| WO | WO 95/20787 | 8/1995 |
| WO | WO 97/18546 | 5/1997 |
| WO | WO 97/25657 | 7/1997 |
| WO | WO 01/91100 | 11/2001 |
| WO | WO 02/073587 | 9/2002 |
| WO | WO 03/036457 | 5/2003 |
| WO | WO 2006/020304 | 2/2006 |
| WO | WO 2006/020305 A2 | 2/2006 |
| WO | WO 2006/094308 | 9/2006 |

OTHER PUBLICATIONS

Dennerlein, J. et al., Vibrotactile Feedback for Industrial Telemanipulators, Presented at the Sixth Annual Symposium on

(56) References Cited

OTHER PUBLICATIONS

Haptic Interfaces for Virtual Environment and Teleoperator Systems, ASME IMECE, Dallas, Texas, Nov. 15-21, 199.
Eberhardt, S. et al., Force Reflection for Wimps: A Button Acquisition Experiment, Proceedings of the ASME Dynamic Systems and Control Division, presented at eh 1997 ASME Internaational Mechanical Engineering Congress and Exposition, Nov. 16-21, 1997, Dallas, Texas.
IEEE International Conference on Robotics and Automation, May 16-20, 1998, Lueven, Belgium.
Hayward, V. et al., Parameter Sensitivity Analysis for Design and Control of Force Transmission Systems, McGill University Center for Intelligent machines, 3480 Universtiy Street, Montreal, Quebec.
Kim, W., Telemanipulator Technology and Space Telerobotics, Proceedings from SPIE—The International Society for Optical Engineering, Sep. 7-9, 1993, Boston, Mass.
Kontarinis, D. et al., Tactile Display of Vibratory Information in Teleoperation and Virtual Environments, Presence, vol. 4, No. 4, Fall 1995, pp. 387-402.
Kontarinis, D. et al., Display of High-Frequency Tactile Information to Teleoperators, Harvard University Division of Applied Sciences, Cambridge, Mass.
MacLean, K., Designing with Haptic Feedback, Symposium on Haptic Feedback in the Proceedings of the IEEE Conference on Robotics and Automation, Apr. 22-28, 2000.
Marcus, B., Touch Feedback in Surgery, Official Proceedings of Virtual Reality and Medicine the Cutting Edge, Sep. 8-11, 1994, The New York Hilton.
McAffee, D. et al., Teleoperator Subsystem/ Telerobot Demonstrator: Force Reflecting Hand Controller Equipment Manual, Jet Propulsion Laboratory, Jan. 1988.
McLaughlin, M. et al., The USC Interactive Art Museum: Removing the Barriers between Museums and their Constituencies, web site at http://ascusc.org/icmc/paperforica.html, as available via the Internet and printed Jul. 22, 2003.
Mine, M. et al., Virtual Environment Interaction Techniques, Department of Computer Science, University of North Carolina, Chapel Hill, NC, 1995.
Minsky, M., Computational Haptics: The Sandpaper System for Synthesizing Texture for a Force-Feedback Display, Submitted to the Program in Media Arts and Sciences, School of Architecture and Planning, in partial fulfillment of the requirements for the degree of Doctor of Philosophy at the Massachusetts Institute of Technology, Jun. 1995.
Noll, M., Man-Machine Tactile, SID Journal, Jul./Aug. 1972.
Ouh-Young, M. et al., Creating an Illusion of Feel: Control Issues in Force Display, Computer Science Department, University of North Carolina at Chapel Hill, Sep. 16, 1989.
Ouh-Young, M., Force Display in Molecular Docking, The University of North Carolina at Chapel Hill, 1990.
Ouh-Young, M. et al., The Development of a Low-Cost Force Feedback Joystick and its Use in the Virtual Environment. Proceedings of the Third pacific Conference on Computer Graphics and Applications, Pacific Graphics , Aug. 21-24, 1995.
Pao, L. et al., Synergistic Visual/Haptic Computer Interfaces, Hanoi, Vietnam, pp. 155-162, May 1998.
Patrick, N. et al., Design and Testing of a Non-Reactive, Fingertip, Tactile Display fro Interaction with Remote Environments, Massachusetts Institute of Technology, Department of Mechanical Engineering.
Patrick, N., Design, Construction, and Testing of a Fingertip Tactile Display for Interaction with Virtual and Remote Environments, Submitted to the Department of Mechanical Engineering in partial fulfillment of the requirement for the degree of Masters of Science in Mechanical Engineering at the Mass. University of Technology, Aug. 1990.
Pimentel, K. et al., Virtual Reality through the New Looking Glass, Second Edition, 1995.
Rabinowitz, W. et al., Multidimensional Tactile Displays: Identification of Vibratory Intensity, Frequency, and Contractor Area, Journal of the Acoustical Society of America, vol. 82, No. 4, Oct. 1987.
Ramstein, C., Combining Haptic and Braille Technologies: Design Issues and Pilot Study, Second Annual ACM Conference on Assistive Technology, Apr. 11-12, 1996.
Rosenburg, L., Virtual Fixtures: Perceptual Overlays Enhance Operator Performance in Telepresence Tasks, A Dissertation submitted to the Department of Mechanical Engineering and the Committee on Graduate Studies of Stanford University in partial fulfillment of the requirements for the degree of Doctor of Philosophy, Jun. 1994.
Ruspini, D. et al., The Haptic Display of Complex Graphical Environments, Computer graphics Proceedings, Annual Conference Series, 1997.
Russo, M., The Design and Implementation of a Three Degree of Freedom Force Output Joystick, Submitted to the Department of Mechanical Engineering in partial fulfillment of the requirement for the degree of Masters of Science in Mechanical Engineering at the Mass. University of Technology, May 1990.
Safe Flight Instrument Corporation, Coaxial Control Shaker, part No. C-25502, Jul. 1, 1967, revised Jan. 28, 2002.
Scannell, T., Taking a Joystick Ride, Computer Currents, Boston Edition, vol. 9, No. 11, Nov. 1994.
Schena, B., Patent Application Transmittal, Directional Inertial Tactile Feedback using Rotating Masses, Sep. 28, 2001.
Schmult, B. et al., Application Areas for a Force-Feedback Joystick, DSC—vol. 49, Advances in Robotics, Mechatronics, and Haptic Interfaces, ASME 1993.
Shimoga, K. , Finger Force and Touch Feedback Issues in Dexterous Telemanipulation, Proceedings from the Fourth Annual Conference on Intelligent Robotic Systems fro Space Exploration, Rensselaer Plytechnic Institute, Troy, New York, Sep. 30-Oct. 1, 1992.
Snow, E. New Technology Transmittal, Model-X Force Reflecting Hand Controller, Jun. 15, 1989.
SMK, Multi-Functional Touch panel, Force-Feedback Type, Developed, Sep. 30, 2002.
SMK, Force Feedback Type Optical Touch Panel Developed, Oct. 30, 2002.
Stanley, M. et al., Computer Simulation of Interacting Dynamic Mechanical Systems using Distributed Memory Parallel Processors, DSC—vol. 42, Advances in Robotics, ASME 1992.
Terry, J. et al., Tactile Feedback in a Computer Mouse, Proceedings of the Fourteenth Annual Northeast Bioengineering Conference, Mar. 10-11, 1988, University of New Hampshire.
Wiker, S., Teletouch Display Development : Phase 1 Report, Technical Report 1230, Jul. 1988.
Patent Cooperation Treaty, International Preliminary Report on Patentability, International Application No. PCT/US2007/026355, mailed Jul. 9, 2009.
Translation of Notice of Reasons for Rejection mailed Aug. 28, 2012 for corresponding Japanese Application No. 2009-544090.
Supplementary European Search Report dated Dec. 12, 2012 for corresponding European Patent Application No. 07863260.1.
Japanese Patent Office, Notice of Reasons for Rejection, Application No. 2009-5440901 dated Feb. 4, 2014.
Korean Patent Office, Notice of Preliminary Rejection, Application No. 10-2014-7010835 dated Jul. 29, 2014.
Korean Patent Office, Notice of Preliminary Rejection, Application No. 10-2009-7015696 dated Jan. 23, 2014.
Japanese Patent Office, Pretrial Report, Application No. 2009-544090 dated Jul. 23, 2014.
Japanese Patent Office, Notice of Reasons for Rejection, Application No. 2013-217205 dated Sep. 30, 2014.
Japanese Patent Office, Notice of Reasons for Rejection, Application No. 2009-544090 dated Oct. 28, 2014.
Japanese Patent Office, Decision of Rejection, Application No. 2013-217205 dated Aug. 18, 2014.
Japanese Patent Office, Notice of Reasons for Rejection, Application No. JP 2015-087121 dated Feb. 16, 2016.
Translation of Notice of Reasons for Rejection mailed Jun. 18, 2013 for corresponding Japanese Application No. 2009-544090.

\* cited by examiner

VIRTUAL DETENTS THROUGH VIBROTACTILE FEEDBACK

CROSS-REFERENCES TO RELATED APPLICATION

This application claims priority to U.S. Provisional Patent Application No. 60/877,333 entitled "Virtual Detents through Vibrotactile Feedback," filed Dec. 27, 2006, the entirety of which is hereby incorporated by reference.

FIELD OF THE INVENTION

The present invention generally relates to vibrotactile feedback. More particularly, the present invention relates to methods and systems for providing virtual detents through vibrotactile feedback.

BACKGROUND

Traditional mechanical device controls include switches, knobs, levels, sliders, faders, and the like. In the past, such controls have been essentially mechanical in nature, e.g., a knob turning a shaft coupled to a potentiometer to control an electrical input to a device such as a radio or audio amplifier, a knob turning a shaft coupled to a fan control or heating/air conditioning control in an automobile, or a lever controlling the opening and closing of a vent in an automobile.

With many traditionally mechanical functions being replaced by electronics, operation of electronic controls has been made less intuitive to users. For example, without click-stops or "detents," or otherwise a sense of mechanical resistance, it may be difficult to obtain a similar experience from an electronic substitute for a traditional mechanical control device or even effectively and efficiently operate such a device. A detent, such as a mechanical detent, can refer to the resistance of rotation of a wheel or shaft. A detent can be used to divide a rotation into discrete increments, or may be used to arrest rotation in a direction. For instance, a mechanical detent can be constructed from a notched wheel and a small gravity or spring-actuated lever.

SUMMARY

Embodiments of the present invention disclosed herein provide methods and systems for providing virtual detents through vibrotactile feedback.

One embodiment of the invention is a method comprising the steps of receiving an input signal that comprises information associated with the manipulation of an input device, and generating a vibrotactile signal configured to cause an actuator to produce a vibrotactile effect comprising a virtual detent to the input device. In another embodiment, a computer-readable medium (such as, for example, random access memory or a computer disk) comprises code for carrying out such a method.

Another embodiment of the invention is a system comprising an input device and a processor that is in communication with the input device and that is configured to receive an input signal comprising information associated with the manipulation of the input device. The processor may further be configured to generate a detent signal based at least in part on the manipulation of the input device. The system may further comprise an actuator coupled to the input device. The actuator may be in communication with the processor and configured to produce to the input device a vibrotactile effect comprising a virtual detent based at least in part on the detent signal.

Further details of embodiments of the invention are set forth below.

BRIEF DESCRIPTION OF THE DRAWINGS

These and other features, aspects, and advantages of the invention are better understood when the following Detailed Description is read with reference to the accompanying drawings, wherein.

DETAILED DESCRIPTION

Embodiments of the present invention provide methods and systems for virtual detents through vibrotactile feedback. In one illustrative embodiment, a rotary knob input device is rotated. A sensor detects the rotation of the rotary knob and sends an input signal to a processor. The input signal comprises information related to the rotation of the rotary knob, such as how far the knob has been turned. The processor determines whether to manipulate an audio system based at least in part on the input signal. The processor further determines whether to generate a signal configured to cause an actuator to vibrate the rotary knob, the vibration based at least in part on the signal.

This example is given to introduce the reader to the general subject matter discussed. The invention is not limited to this example. Below, examples of methods and systems for virtual detents through vibrotactile feedback are described.

Illustrative Devices for Enhanced Haptic Feedback

In one illustrative embodiment of a device configured to provide virtual detents through vibrotactile feedback, a portable music player may be configured to play music through a speaker and produce a virtual detent on a touch pad with an actuator. In one such embodiment, the portable music player may comprise a touch pad configured to generate an input signal to a processor based on a user contact. The processor may analyze the input signal and determine whether to manipulate the audio system and whether to generate a vibrotactile effect. If the processor determines a vibrotactile effect should be generated, the processor may generate a signal. The signal may be configured to cause the actuator to produce a vibrotactile effect to the touch pad in the form of a virtual detent.

Such an illustrative embodiment may be advantageously employed to simulate mechanical detents through vibrotactile feedback. Such simulated mechanical detents, or virtual detents, may provide useful feedback to a user. For example, a virtual detent may indicate the successful change in volume of a sound system. As another example, the absence of a virtual detent may indicate that a climate system is not turned on, or that it has reached the highest threshold of operation.

These further examples are given to introduce the reader to the general subject matter discussed herein. The invention is not limited to these examples. The following sections describe various embodiments of systems and methods for providing virtual detents through vibrotactile feedback.

Example of a First System for Virtual Detents Through Vibrotactile Feedback

Figure 1:
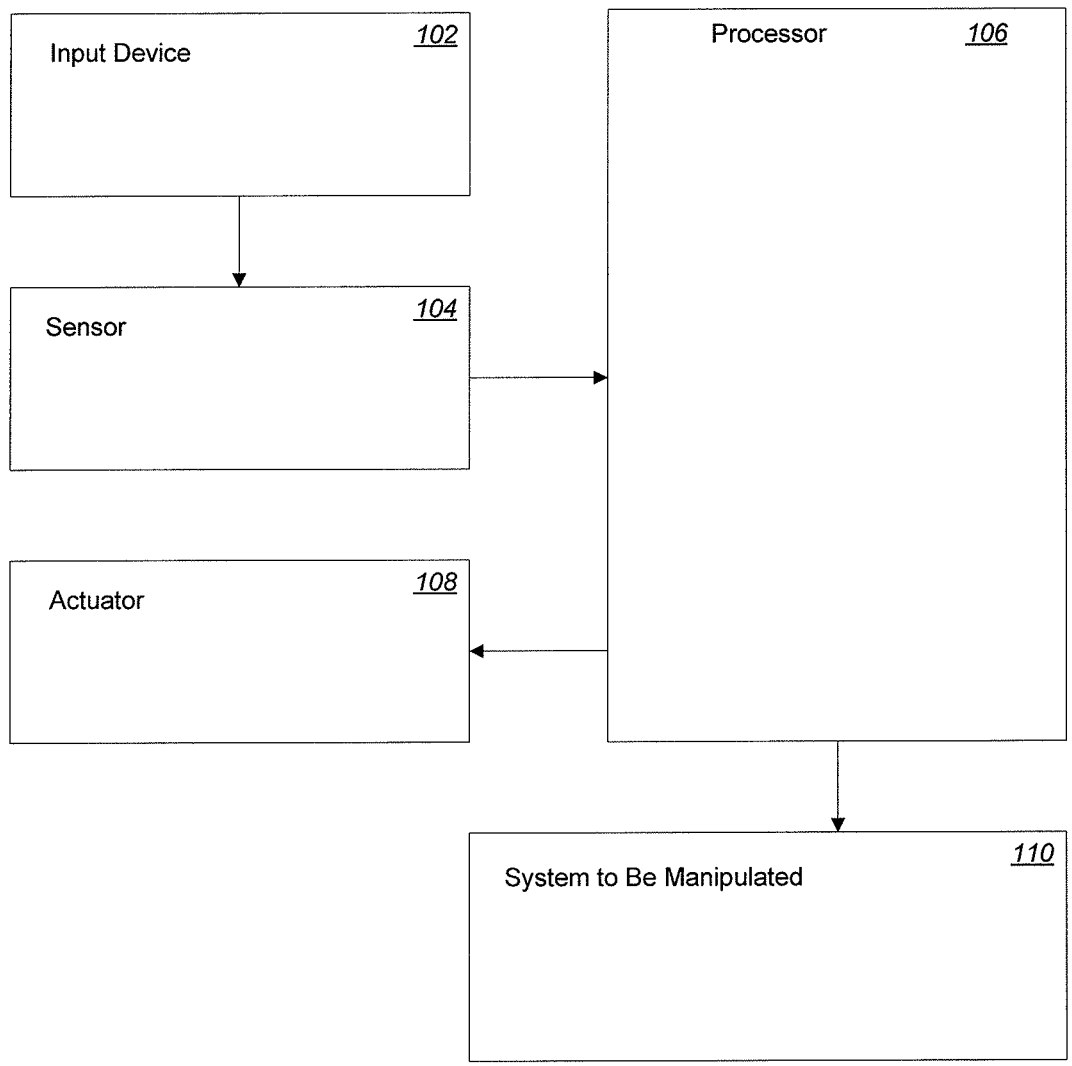
FIG. 1 is a block diagram illustrating a first system for providing virtual detents through vibrotactile feedback in one embodiment of the invention.

Referring now to the figures in which like numerals indicate like elements throughout the several figures, FIG. 1 is a block diagram illustrating a first system for providing virtual detents through vibrotactile feedback in one embodiment of the invention. In the embodiment shown, the system comprises an input device 102, a sensor 104, a processor 106, an actuator 108, and a system to be manipulated 110.

The Input Device and Sensor

Systems of the invention comprise an input device 102 and a sensor 104. The input device 102 shown in FIG. 1 is configured to provide an input signal to the processor when the input device 102 is manipulated. In other embodiments, sensor 104 can generate an input signal when the sensor 104 detects manipulation of the input device 102.

The input device 102 can be, for example, a mechanical input device. Examples of mechanical input devices include a rotary knob coupled to an encoder. Encoders of the input device 102 may comprise an optical encoder or a potentiometer. In other embodiments, the input device 102 may be a non-mechanical input device. For example, the input device 102 may be a touch-sensitive device, such as a touch pad or a touch screen.

The input device 102 is in communication with a sensor 104. The sensor detects movement of the input device 102. A sensor 104 can be configured to detect the movement of a rotary knob, or other aspects of manipulation of the input device 102, such as position, velocity, acceleration, torque, rate of rotation, or the time of rotation.

Sensor 104 shown in FIG. 1 comprises a contact-type sensor, such as a switch, a resistive sensor, a capacitive sensor, an infrared sensor, or an optical sensor. Alternatively, sensor 104 may comprise a non-contact sensor such as a field effect sensor or a proximity sensor, and can be a surface or sub-surface sensor.

The Processor

The system illustrated in FIG. 1 comprises a processor 106. The processor 106 may be configured to receive input signals from an input device 102 or a sensor 104 and to generate signals to an actuator 108. The signals may be configured to cause the actuator 108 to produce a vibrotactile effect. Further, the processor can generate signals provided to a system to be manipulated 110.

In one embodiment, a dedicated processor 106 may receive input signals and generate signals. Although there is a single processor shown in FIG. 1, the system may comprise a plurality of processors. The processor 106 may be configured to perform a variety of tasks. For example, the processor 106 may comprise additional program code running on a native cellular phone processor.

The processor 106 may be configured to receive input signals. In some embodiments, the processor 106 may receive input signals from the input device 102. In other embodiments, the processor 106 may receive input signals from the sensor 104. In the embodiment shown in FIG. 1, the input device 102, sensor 104 and the processor 106 are in communication via a direct wired digital connection. For example, the input device 102, sensor 104, and the processor 106 may be in communication via a communication bus such as the Universal Serial Bus (USB). In other embodiments, communication between an input device 102, sensor 104 and the processor 106 may be through analog signals and/or may be wireless. For instance, the sensor 104 may be able to use Bluetooth, Wireless USB or Wi-Fi to communicate with the processor 106.

The processor 106 can also generate one or more signals. For example, a processor may generate a signal when a valid input signal is received. In the embodiment shown in FIG. 1, as the input device 102 is manipulated, the processor 106 may generate a signal at the same time or immediately after the manipulation. In one embodiment, the processor 106 may process software code running as an application on the processor and utilize the input signal in the context of the software code to generate signals configured to cause virtual detents.

The processor 106 may generate a signal, such as a detent signal, to the actuator 108. The detent signal may be configured to cause an actuator 108 to produce a vibrotactile effect in the form of a virtual detent on the input device 102.

The processor 106 may generate a signal specific to an actuator 108. In one embodiment, the signal may be generated with parameters specific to the actuator 108. For example, the processor may analyze parameters associated with the actuator 108, such as the actuator's resonant frequency, and generate a signal based at least in part on the parameters. Other parameters of the actuator 108 may comprise, for example and without limitation, a resonant frequency of the actuator, a maximum peak-to-peak amplitude or magnitude of the actuator, or a minimum actuator response time.

The processor 106 may generate a signal by accessing a detent profile stored in a memory (not shown in FIG. 1). In one embodiment, the processor 106 may access a specific detent profile based at least in part on the input signal. In certain embodiments, the processor 106 may determine which of a plurality of simulated mechanical detents to generate. For example, the processor 106 may analyze the input signal and determine that a hard stop is appropriate. Further, the processor 106 may then access the hard stop virtual detent profile in a memory, and generate a detent signal based on the hard stop virtual detent profile.

The processor 106 may be in communication with a system to be manipulated 110 or controlled. In some embodiments, the processor 106 may be configured to generate a system signal. The system signal may be provided to the system to be manipulated 110.

The system signal may be based at least in part on the manipulation of the input device. For example, an input device 102 in the form of a rotary knob may be rotated one entire revolution. The processor 106 may receive an input signal indicating the complete rotation of the input device 102 and generate a system signal configured to manipulate a system 110 by maximizing or minimizing a level of the system.

While the device shown comprises one processor 106, other devices may comprise two or more processors. Processor 106, as well as other processors incorporated into one or more embodiments of the present invention, may comprise a computer-readable medium, such as a random access memory (RAM) coupled to the processor (not shown in FIG. 1). The processor executes computer-executable program instructions stored in memory, such as executing one or more computer programs for generating vibrotactile or other haptic effects. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The processor, and the processing, described may be in one or more structures, and may be dispersed through one or more structures. The processor may comprise code for carrying out one or more of the methods (or parts of methods) described herein. The instructions can comprise code from any suitable computer-programming language, including, for example, assembly code, C, C+, C++, Visual Basic, Java, Python, and JavaScript.

The Actuator

The system illustrated in FIG. 1 further comprises one or more actuators 108. Each actuator 108 can be configured to receive a signal from the processor 106 and provide vibrotactile effects to the user in the form of virtual detents. The actuator 108 can vibrate the input device 102 to provide vibrotactile feedback.

The actuator 108 can provide vibrotactile feedback based on signals received from the processor 106. For example, the actuator 108 may be configured to generate a vibration after receiving a detent signal from the processor 106. The actuator 108 can vibrate the input device 102 at substantially the same time the input device is being manipulated.

The actuator 108 may be configured to simulate mechanical feedback through vibrotactile feedback. Specifically, in some embodiments the actuator 108 may be configured to provide the perception of a detent (i.e. a virtual detent) without the traditional means necessary for a mechanical detent. For example, the actuator 108 may be used in place of various mechanical components which traditionally provided tactile feedback, such as springs, brakes or cams. In some embodiments, the vibrotactile feedback may comprise a click effect replicating a mechanical click. In other embodiments, the vibrotactile feedback may not comprise a click effect, but some other effect, such as a spring effect or a barrier effect.

The actuator 108 may be configured to generate vibrotactile feedback with a variety of different characteristics. For example, the actuator may be configured to generate vibrotactile feedback with different frequencies, amplitudes, or waveforms. In one embodiment, the virtual detent may comprise a simulated click generated through a single pulse. In a second embodiment, the virtual detent may comprise a click-and-release effect generated by a double pulse. FIG. 9 provides illustrations of various virtual detent profiles.

Because the actuator 108 may be configured to generate vibrotactile feedback, in contrast to mechanical feedback, the actuator 108 may provide vibrotactile feedback to non-mechanical input devices 102, such as a touch-sensitive pad, i.e., a touch pad or touch screen.

The actuator 108 may be configured to generate various types of vibrotactile feedback. For example, the actuator 108 may be configured to produce different virtual detents. The vibrotactile feedback may be generated in various directions. For example, the actuator 108 may vibrate the input device orthogonal to the motion of the input device.

The actuator 108 can be any of a variety of different types of force producing devices, including an eccentric rotating mass (ERM) actuator, a multifunctional (MFT) actuator, a linear mass actuator, an electro-magnetic actuator, a motor, a voice coil, a pneumatic or hydraulic actuator, an electro-active polymer, or any other suitable actuator. In one embodiment, actuator 108 may comprise a plurality of actuators of the same or different design. For example, in one embodiment, two actuators may be employed. A first actuator may be configured to provide vibrotactile or other haptic effects having a high frequency of vibration (e.g. greater than 400 Hz), while a second actuator may be configured to provide vibrotactile or other haptic effects having a low frequency of vibration (e.g. less than 400 Hz).

Since some embodiments of the invention may use the actuator 108 to generate vibrotactile feedback, as opposed to mechanical feedback, a smaller actuator may be used than in other devices. For example, actuator 108 may comprise a circular actuator ten (10) millimeters in diameter and three and one half (3.5) millimeters thick.

Since the device may comprise a plurality of actuators, the number of actuators 108 may be based on the size and mass of the device. For example, an actuator 108 may be provided for every one hundred (100) grams of mass of the system. In such an example, a system measuring three hundred (300) grams may comprise three actuators. In another example, a cellular phone measuring three hundred (300) grams may only comprise a single but more powerful actuator.

In one embodiment, the number of actuators 108 may be based on what surface of the system is being vibrated. For example, if a PDA measures four hundred (400) grams, but only the display will be vibrated, the system may comprise only one actuator 108, especially if the display is isolated from the rest of the device such as by a suspension system. Alternatively, if vibrotactile feedback is provided to the entire PDA, the system may comprise two or more actuators.

Each actuator 108 of a plurality of actuators may be configured to generate vibrotactile feedback to the input device 102. In one embodiment, the vibrotactile feedback generated by each of a plurality of actuators is synchronized.

The actuator 108 can be mounted to a touch-sensitive display, such as a touch screen (not shown in FIG. 1). In one embodiment, the actuator 108 is mounted underneath the display, or alternatively, to the edge of the display, or laterally mounted to the display. In embodiments where the actuator 108 is mounted to a display, the display may be mounted in a suspension of compliant material, such as a foam gasket. Mounting a display to a foam gasket may ensure that the display is vibrated alone or with a different strength than the entire device.

In one embodiment, two actuators may be mounted to either side of a display. In one example, both actuators may face the same direction and be in the same phase. In one embodiment, two side-mounted actuators may vibrate a screen side-to-side. Side-mounted actuators may produce consistent forces across a screen, since the screen may be moving in the direction of its rigidity.

In one embodiment, two actuators are mounted behind a display. In one example, both actuators mounted behind the display may face the same direction and can vibrate the display in and out.

The System to be Manipulated

The system illustrated in FIG. 1 comprises a system to be manipulated 110. One or more systems to be manipulated 110 can each receive system signals from the processor 106. The system to be manipulated 110 may comprise a system capable of electrical or electromechanical control, such as and without limitation, a stereo system, a video system, a climate system (e.g. air conditioning and/or heating), a navigation system, automotive systems, wireless communication devices, security systems, a television, a video game system, a washing machine or a drying machine, or an oven.

In one embodiment, the system to be manipulated 110 may comprise a single system, such as a lighting system. In another embodiment, the system to be manipulated 110 may comprise a complex system comprising one or more elements. For example, the system to be manipulated 110 may be a heating and cooling system.

Figure 2:
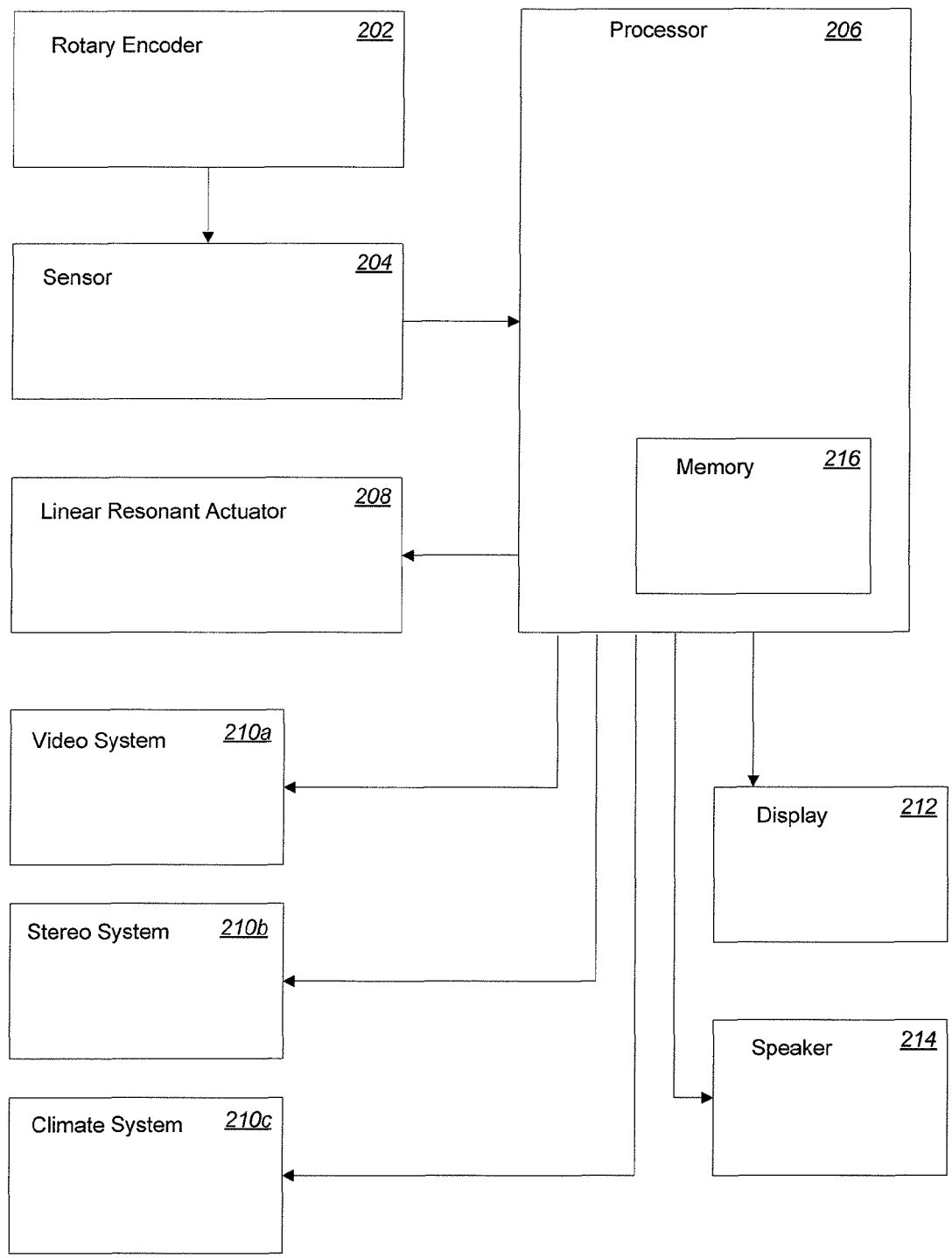
FIG. 2 is a block diagram illustrating a second system for providing virtual detents through vibrotactile feedback in one embodiment of the invention.

Example of a Second System for Virtual Detents Through Vibrotactile Feedback FIG. 2 is a block diagram illustrating a second system for providing virtual detents through vibrotactile feedback in one embodiment of the invention. In the embodiment shown, the system comprises a rotary encoder 202, a sensor 204, a processor 206, and a linear resonant actuator 208. The system further comprises a visual system 210a, an audio system 210b, a climate system 210c, a display 212, a speaker 214, and a memory 216. An example of a visual system 210a is a video game system. An example of an audio system 210b is a stereo system. An example of a climate system 210c is an air conditioning and heating system.

As shown in FIG. 2, the input device can be the rotary encoder 202. The sensor 204 is in communication with the rotary encoder 202 and the processor 206. As the rotary encoder 202 is manipulated, the sensor 204 generates input signals associated with the manipulation, and transmits the input signals to the processor 206.

Once the processor 206 receives an input signal, the processor 206 can determine whether to generate a detent signal and/or a system signal. For example, if the input signal indicates a rotation of a knob in more than 5 degrees of motion, the processor 206 may generate a system signal and a detent signal.

The processor 206 is in communication with the linear resonant actuator 208. The processor 206 can receive input signals comprising information associated with a manipulation of the rotary encoder 206 and generate a signal configured to cause the linear resonant actuator 208 to produce a vibrotactile effect to the rotary encoder 202, the vibrotactile effect comprising a simulated mechanical detent.

As shown in FIG. 2, the processor 206 is in communication with three systems: a video system 210a, a stereo system 210b, and a climate system 210c. The processor is also in communication with a display 212 and a speaker 214. The processor may synchronize changes in the display 212, sounds played via a speaker 214, and vibrotactile feedback in the rotary encoder 202.

In other embodiments, the input device may comprise a different device, such as a touch pad. The touch pad (not shown) may be in communication with a sensor 204. The sensor 204 may be configured to detect movement on the touch pad.

The sensor 204 can directly transmit input signals to the processor 206. In a specific example, the sensor 204 may send an input signal to the processor 206 once the rotary encoder is rotated 2 degrees or more.

The processor 206 can be in communication with one or a plurality of systems to be controlled. The processor 206 can cause the display 212 to show a graphical representation of a menu structure. The processor 206 can synchronize vibrotactile feedback with other events, such as changes in the display 212 or sounds played on the stereo system 210b. In one example, as the navigation of a menu system is shown on display 212, the input device may be vibrated while each item on the menu is traversed.

The processor 206 can be configured to determine a specific detent signal to generate. The detent signal may be based at least in part on the system which is actively being controlled. For example, if the video system 210a is being controlled, the processor 206 may generate one type of detent signal, such as a click effect. Alternatively, if the stereo system 210b is being controlled, the processor 206 may generate a second type of detent signal, such as a hard stop virtual detent.

As shown in FIG. 2, the processor 206 comprises memory 216. The memory 216 can be a high-speed cache memory, and configured to store vibrotactile feedback effects, such as virtual detent profiles. In one embodiment, the processor can access an effect profile stored in memory 216 after the processor 206 has determined what type of vibrotactile effect to generate.

A default library of vibrotactile effects, such as virtual detents, may be stored in the memory 216. For example, the processor 106 may store each virtual detent profile illustrated in FIG. 9 in the memory 216. This profile may take the form of computer code. In one embodiment, the processor may be programmed with various types of vibrotactile effects not previously stored in memory 216. For example, each user of the system may author individual vibrotactile effects to store in memory 216. In a second embodiment, the processor 106 may only store vibrotactile effects programmed by a manufacturer. In one embodiment, characteristics of the actuator may be stored in memory 216. For example, the frequency response of a system's actuator may be stored in memory 216.

Virtual Detents Through Vibrotactile Feedback

Figure 3:
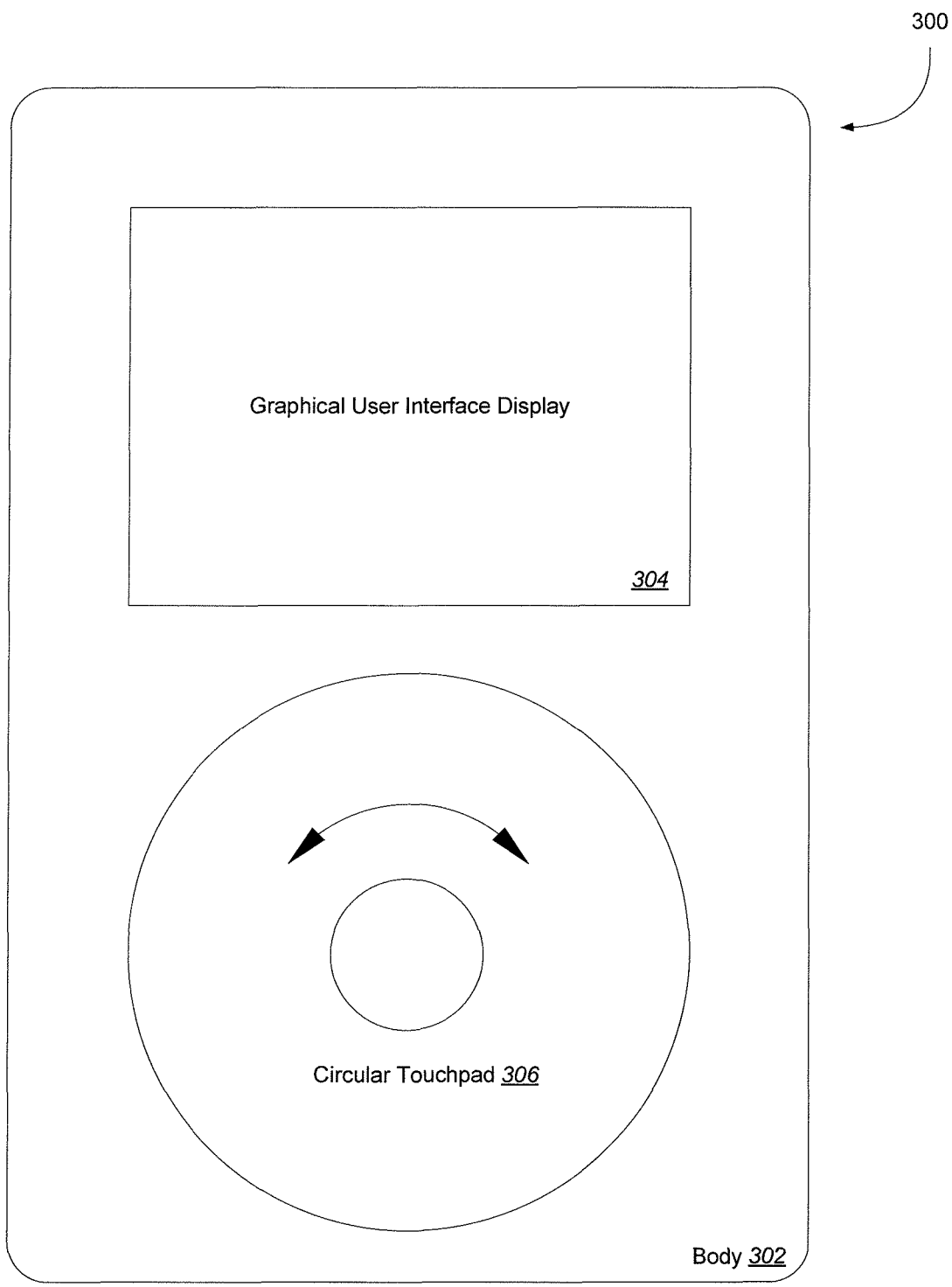
FIG. 3 is an illustration of a first device for providing virtual detents through vibrotactile feedback in one embodiment of the present invention.

FIG. 3 is an illustration of a first device for providing virtual detents through vibrotactile feedback in one embodiment of the present invention. Various embodiments of the invention may be used in devices without mechanical feedback. In other embodiments, the invention may be used to supplement mechanical feedback.

The device in FIG. 3 comprises a portable music player 300 having a body 302, a graphical user interface display 304, and a circular touch pad 306. Although the touch pad 306 shown in FIG. 3 is circular, in other embodiments the touch pad 306 may be linear, rectangular, or some other configuration. As shown in FIG. 3, the input device 306 may be in communication with a display 304. As an example, the input device 306 may be configured to navigate a menu system which may be shown on the display 304. In other embodiments, the input device 306 may not be in communication with a display 304.

While the embodiment shown in FIG. 3 comprises a portable music player, other embodiments may comprise other devices, such as a personal digital assistant (PDA), a portable video player, a portable game system, or a portable navigation device. Other examples may include other electronic devices or appliances, such as a television, oven, or a lighting system.

A user may interact with the portable music player 300 by activating the circular touch pad 306. For example, a user may select an object on a menu displayed on the graphical user interface display 304 by dragging a finger around the circular touch pad 306 in a clockwise or counter-clockwise direction.

An actuator (not shown in FIG. 3) is coupled to the touch pad. As a user manipulates the circular touch pad 306, vibrotactile feedback in the form of virtual detents are provided to the user when the actuator vibrates the touch pad. The actuator generates virtual detents through vibrotactile feedback, to simulate mechanical feedback.

Since the vibrotactile feedback may be programmable and variable, providing different types of vibrotactile feedback on the same input device will provide an enhanced interface. Vibrotactile feedback may aid in the selection of menus, control of levels (such as volume, bass, treble, balance, etc.), and navigation of lists.

Vibrotactile feedback may be based on the validity of an input. In one example, vibrotactile feedback is provided when a valid input is received, such as when a control is enabled and within an allowed range. If the controlled function is at or reaches a maximum or a minimum, vibrotactile feedback may be disabled, providing information that the attempted control is outside of the valid range of the system. Similarly, if the system is not active or powered on, the absence of vibrotactile feedback may inform the user of that state.

The frequency and strength of the vibrotactile feedback may also be varied to provide an enhanced interface. In one embodiment, the type of vibrotactile feedback may be based at least in part on the content selected by a user.

In one embodiment the frequency and strength of the vibrotactile feedback notifies the user of various levels of control. A stronger virtual detent can indicate a bigger decision in comparison to a weaker virtual detent indicative of a smaller decision. High and low strengths of vibrotactile feedback can indicate divisions in a list (i.e. separate words by letter, or numbers at every multiple of 10). A high or low strength of vibrotactile feedback can also indicate one or more points in a range, for example, the center position of a balance control. The frequency of the vibrotactile feedback may represent the speed of navigation of the user's finger across the touch active surface or across the number of elements in a list.

In one embodiment, each system that is controlled by the input device may be associated with a type or profile of vibrotactile feedback. For example, the actuator vibrates the input device at a constant intensity when an audio system is being controlled by the input device, and vibrates the input device at a periodic intensity when a temperature system is being controlled.

In one embodiment, a combination of vibrotactile effects is linked as a vibrotactile theme. A vibrotactile theme can correspond with an individual function or system. One theme can comprise a combination of single clicks and double clicks to represent simulated mechanical feedback for a system being changed or a threshold being reached. Another theme can comprise a combination of a constant, low intensity vibration with a hard stop virtual detent effect. While the first theme can be assigned to one system, such as a climate system the second theme can be assigned to a second system, such as a stereo system.

Figure 4:
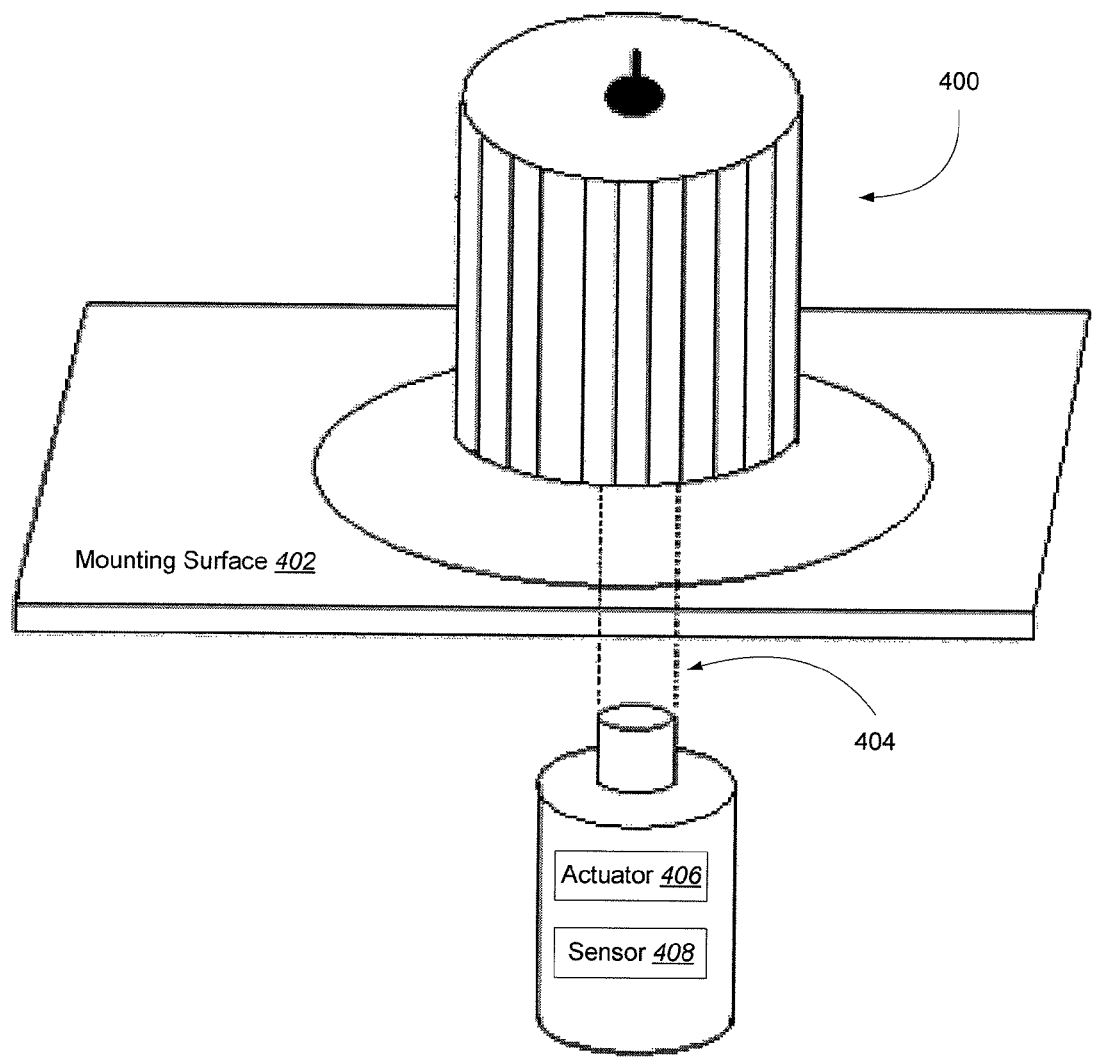
FIG. 4 is an illustration of a second device for providing virtual detents through vibrotactile feedback in one embodiment of the present invention.

FIG. 4 is an illustration of a second device for providing virtual detents through vibrotactile feedback in one embodiment of the present invention. The device in FIG. 4 comprises a mechanical device, specifically a rotary knob 400. While the embodiment shown in FIG. 4 comprises a rotary knob 400, other embodiments may comprise other input devices. In some other embodiments, the input device may comprise a linear or rotary encoder, a potentiometer, or a fader. Alternatively, other embodiments may comprise non-mechanical input devices, such as a touch-sensitive pad or a touch-sensitive screen.

The rotary knob 400 is configured to rotate in a rotary degree of freedom about an axis extending through the knob. In some embodiments, the rotary knob may also be configured to move in a plane perpendicular to or along the rotary axis. The rotary knob 400 is coupled to a mounting surface 402. The mounting surface may be a surface on a control panel, dashboard, car console, mouse, joystick, industrial equipment, medical equipment, or any consumer electronics device.

A user interacts with the rotary knob 400 by rotating the knob in a clockwise or counter-clockwise direction. One or more actuators 406 can be coupled to the rotary knob 400 to generate vibrotactile feedback. As the knob is rotated, vibrotactile feedback may be generated in the form of virtual detents. For example, as the knob is rotated, an effect such as a hard stop may be generated by vibrating the knob.

The rotary knob 400 can be coupled to a sensor 408. Sensor 408 can detect movements in the rotary knob 400, and transmit data to a processor 106. A shaft 404 may connect the actuator 406 and sensor 408 with the rotary knob 400.

As shown in FIG. 4, a rotary knob 400 is a generally cylindrical object. Other devices for providing virtual detents may have various designs, including but not limited to conical shapes, spherical shapes, oval shapes, cubical shapes, etc. The rotary knob 400 may have one or more textures on its surface, including but not limited to bumps, lines, grooves, other types of grips, or projections or members extending from the device's surface. Such shapes and textures may allow a user to easily grip or contact the knob and rotate it.

The rotary knob 400 may be configured to control a system. For example, the rotary knob 400 may be located on a stereo receiver, and configured to control the volume of the stereo. In one embodiment, the rotary knob 400 may control a plurality of systems, such as a car's temperature system, navigation system, and/or communication system. For example, a user can pull a knob to a first elevation in order to control the temperature system of the car. To control a different system, a user may push the knob down to a different elevation. In another embodiment, a user selects a system to be controlled via a menu system navigated by the rotary knob 400 or other controls.

Examples of Methods for Virtual Detents Through Vibrotactile Feedback

Figure 5:
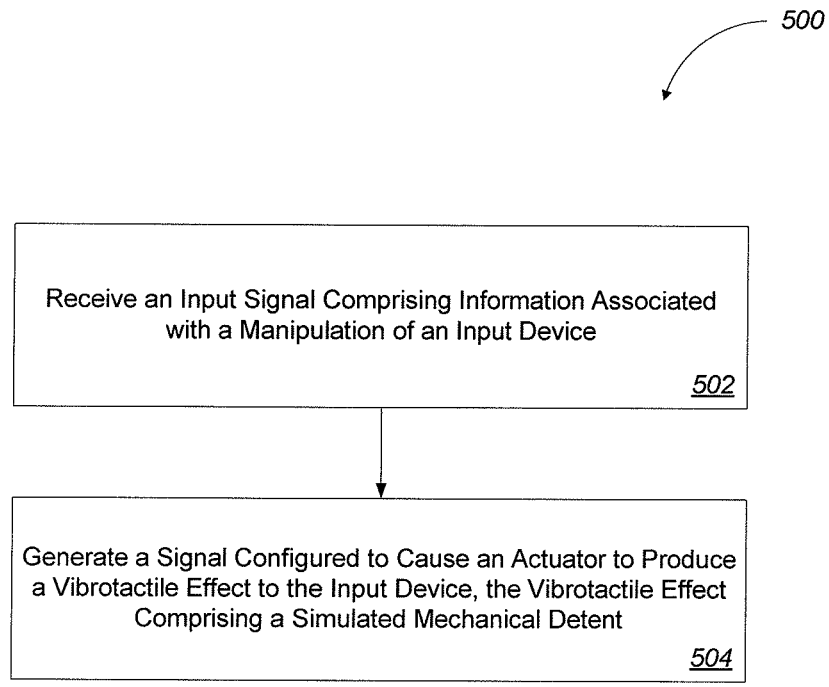
FIG. 5 is a flow diagram illustrating a first method for virtual detents through vibrotactile feedback.

FIG. 5 is a flow diagram illustrating a first method for providing virtual detents through vibrotactile feedback in one embodiment of the present invention. In step 502, the sensor generates an input signal based at least in part on a manipulation of an input device. In step 502, the processor 106 receives an input signal comprising information associated with the manipulation of an input device 102. In step 504, the processor 106 generates a signal configured to cause an actuator to produce a vibrotactile effect to the input device 102, the vibrotactile effect comprising a simulated mechanical detent.

The processor 106 can receive and generate signals as digital signals or analog signals, via wireless or wired connections. The input signal can comprise information related to a manipulation of the input device 102. For instance, the information related to the manipulation of the input device may be positional data, for example, comprising information related to the change in position of the input device. In another example, the input signal may comprise information related to the speed of the change in position of the input device as well as the change in position of the input device. As a further example, the input signal comprises information related to the direction of a continuous user contact with a rotary touch pad along with the speed at which the rotary touch pad is contacted.

In step 504, a signal is generated by the processor. The signal can be configured to cause an actuator to produce a vibrotactile effect to the input device, the vibrotactile effect comprising a simulated mechanical detent, and based at least in part on the detent signal. The signal comprises information relating to a specific virtual detent to be generated by an actuator.

The signal may be based at least in part on the input signal, for instance, if the input signal indicates a fast manipulation of the input device, than the detent signal may comprise a high frequency vibrotactile effect. The signal may be based at least in part on a status of a system to be manipulated. In one embodiment, a signal is not generated if a system is off. In another embodiment, if a system is off, than only a signal configured to produce a hard stop is generated.

In one embodiment, the signal is based on a system reaching a maximum or minimum threshold. For example, if a stereo system has reached the highest volume level, than the signal is configured to produce a hard stop virtual detent. Alternatively, if the system to be controlled has reached a threshold no signal is generated. In another example, if the stereo system has not reached the highest or lowest volume level, a signal configured to produce a click effect virtual detent is generated.

The signal generated by the processor 106 may be synchronized with changes in the system 110. For example, a detent signal can be configured to cause a vibrotactile effect at the same time as changes in a display, audio level or frequency, or control of an electromechanical system. The detent signal may also be synchronized with other types of feedback. For example, vibrotactile feedback produced by an actuator in response to the detent signal may be accompanied by an audible click or noise.

Figure 6:
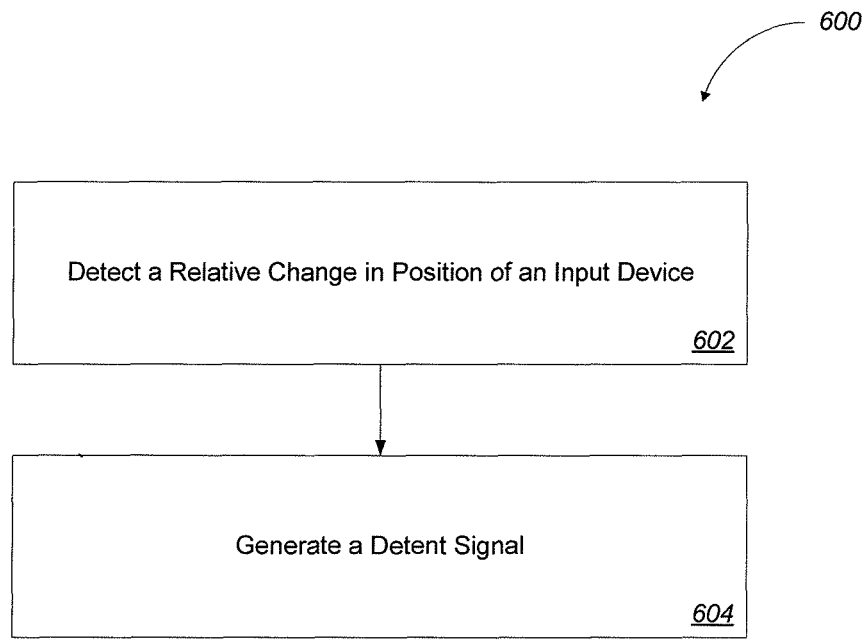
FIG. 6 is a flow diagram illustrating a second method for virtual detents through vibrotactile feedback.

FIG. 6 is a flow diagram illustrating a second method for providing virtual detents through vibrotactile feedback in one embodiment of the present invention. In step 602, a sensor 104 detects a change in position of an input device 102. The sensor 104 can detect the rotation of a knob 400. The sensor 104 may detect, for example, relative changes, or changes from a reference point, in the position of an input device 102.

In step 604, the sensor 104 generates a detent signal. The detent signal can be configured to cause an actuator to produce a vibrotactile effect to the input device, the vibrotactile effect comprising a simulated mechanical detent, the vibrotactile effect based at least in part on the detent signal.

The sensor 104 can be configured to only detect changes above a predetermined threshold. One sensor can be configured to detect movement of a rotary knob in one degree increments. Another sensor can be configured with a higher detection threshold, and only detect rotations of five degrees or more. The detection threshold can correspond to a determination of whether a user intended to manipulate the device, or if the manipulation was accidental or unintended.

One or more sensors 104 can be configured to detect pressure or movement on a touch pad. As an example, three sensors configured to detent changes in force may be coupled to a touch pad. The force sensors may detect input on the touch pad, such as when a user drags a finger across the surface of the touch pad.

A processor 106 can generate the detent signal. The detent signal may be based at least in part on the manipulation or change in position of the input device. For example, a first detent signal may correspond to a small change in position of the input device, whereas a second detent signal may correspond to a larger change in position of the input device.

Figure 7:
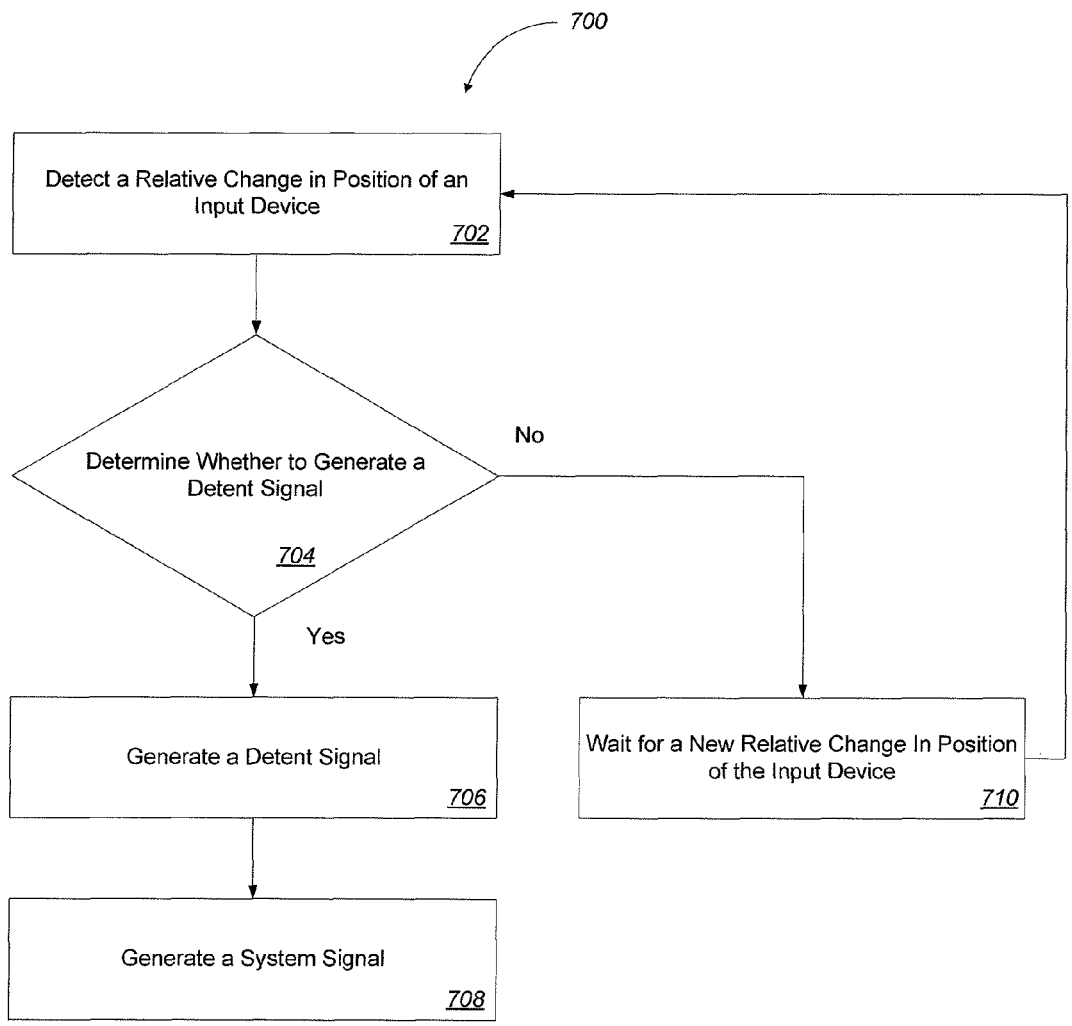
FIG. 7 is a flow diagram illustrating a third method for virtual detents through vibrotactile feedback.

FIG. 7 is a flow diagram illustrating a third method for providing virtual detents through vibrotactile feedback in one embodiment of the present invention. In step 702, the sensor 104 detects a change in position of an input device. The sensor 104 can detect input from a rotary knob 400, or input via a touch pad or touch screen.

In step 704, the processor 106 determines whether to generate a detent signal. The processor 106 may determine whether to generate a detent signal based at least in part on a status of a system to be manipulated 110. For example, the processor 106 may generate a detent signal if the system to be manipulated is turned on. As another example, the processor 106 may not generate a detent signal if the system to be manipulated is turned off.

In step 706, the processor 106 generates a detent signal. The processor 106 can generate the detent signal as a digital signal sent to the actuator 108.

In step 708, the processor 106 generates a system signal. The system signal can be configured to manipulate a system to be controlled, such as an audio system, a video system, a climate system, or a menu system. As examples, the system signal can change the volume of a stereo system, increase the output of a heater or air conditioner, or zoom in on a map.

In step 710, if the processor determines not to generate a detent signal, than the processor may wait for a new change in position of the input device 710.

The processor 106 can generate detent signals and systems signals the system signal as digital signals or analog signals. The processor 106 can generate the detent signal 706 and the system signal 708 substantially simultaneously. In one embodiment, the system to be controlled is manipulated at substantially the same time as the vibrotactile feedback is generated on the input device. In some embodiments, a user may experience a virtual detent as a system is being manipulated, giving the user the impression of mechanical detents.

The system signal can be based at least in part on an input signal. In one embodiment, an input signal may indicate that the input device is being manipulated with a quick motion. A corresponding system signal may manipulate the system to be controlled in a like fashion. In one example, a rotary knob is quickly rotated. A processor may generate a system signal to a stereo system with a radio, the system signal moving through radio frequencies in large increments.

Figure 8:
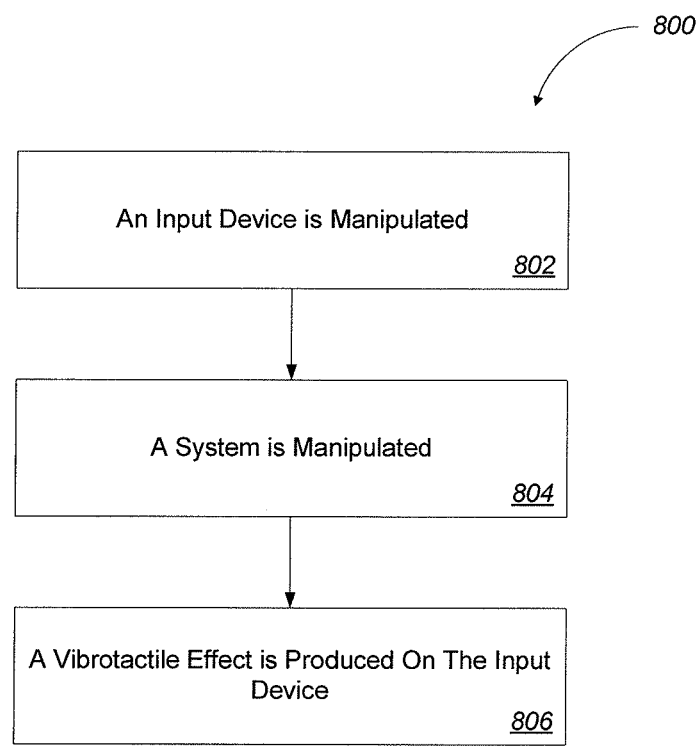
FIG. 8 is a flow diagram illustrating a fourth method for virtual detents through vibrotactile feedback.

FIG. 8 is a flow diagram illustrating a fourth method for virtual detents through vibrotactile feedback. In step 802, an input device, such as a knob or a touch pad, is manipulated. A user can rotate a knob, or drag her finger across a touch pad. In response to the user input, a system is manipulated 804. Finally, a vibrotactile effect is produced on the input device 806.

The system may be manipulated based at least in part on the manipulation of the input device. For example, if a knob is rotated to the right one full revolution, the volume of a stereo system may be doubled. In another example, if a circular touch pad is contacted in a counter-clockwise motion, a menu structure shown on a display may navigate up.

The vibrotactile effect 806 can be synchronized with the manipulation of the system 804. As a user navigates a menu shown on a display, a vibrotactile effect may be produced on a circular touch pad input device.

Examples of Virtual Detents

FIGS. 9A, 9B, 9C, 9D, 9E, 9F, 9G, and 9H are eight illustrations of virtual detent profiles in various embodiments of the present invention. In FIGS. 9A-9H, the rotary knob 202 is shown on the right along with a representation of the virtual detent profile on the left corresponding with the rotary knob. The virtual detent profiles illustrated in FIGS. 9A-9H are exemplary embodiments of the invention. Other embodiments may be apparent to those skilled in the art. In some embodiments, various types of detents may be combined to produce a combination vibrotactile effect.

Figure 9A:
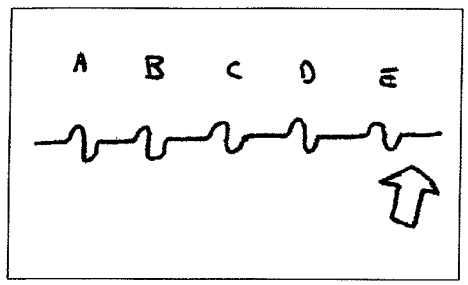
FIGS. 9A, 9B, 9C, 9D, 9E, 9F, 9G, and 9H are eight illustrations of virtual detent profiles in various embodiments of the present invention.
Figure 9A:
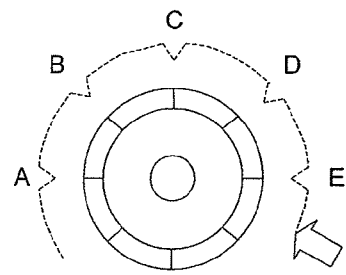

FIG. 9A depicts a programmable virtual detent profile. Virtual detents are shown at A, B, C, D, and E. For example, as a rotary knob is rotated through each point A-E, the rotary knob may be vibrated to generate the feeling of a real detent. The magnitude and width of the vibrotactile feedback applied to the input device at each virtual detent may simulate the magnitude and width of a mechanical detent.

Figure 9B:
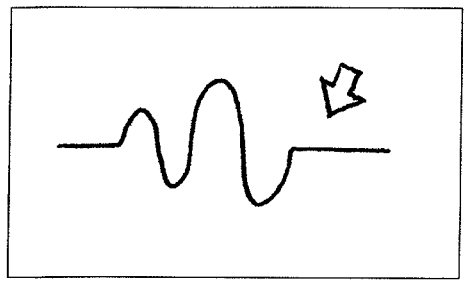
Figure 9B:
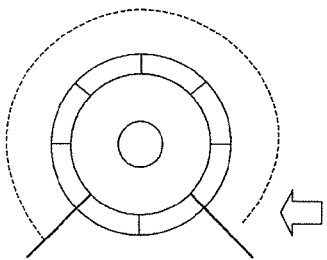

FIG. 9B depicts a hard stop virtual detent profile. A hard stop, or barrier virtual detent, may simulate a mechanical hard stop or barrier. For example, a virtual hard stop may indicate that a system can no longer be manipulated. As an illustration, as a user turns a rotary knob, virtual detents may indicate each increasing fan level selected by a user. When the fan level reaches its maximum, the processor 106 may send a detent signal to the actuator 108 comprising a barrier detent instruction.

Figure 9C:
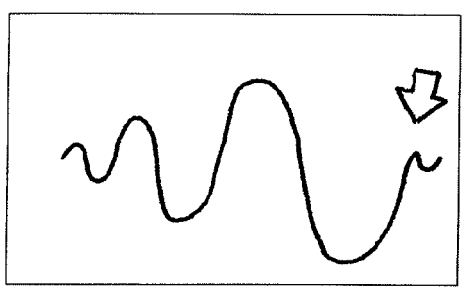
Figure 9C:
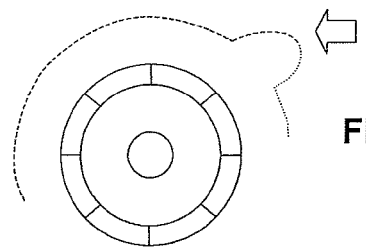

FIG. 9C depicts a hill virtual detent profile. A hill effect may simulate the approach to the end of a menu system, or a maximum or minimum threshold of a system. For example, as the user approaches the last item in a menu, the vibrotactile effect may gradually increase. As another example, when the user is approaching the end of a wrap-around menu structure, the intensity of the vibrotactile feedback may increase until the user reaches the beginning item, which may be accompanied by vibrotactile feedback with lower intensity.

Figure 9D:
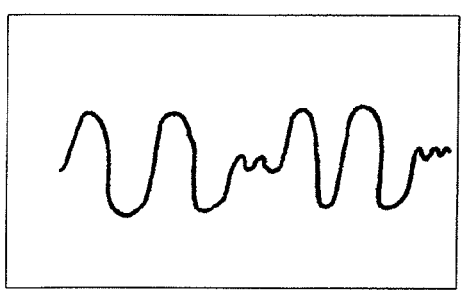
Figure 9D:
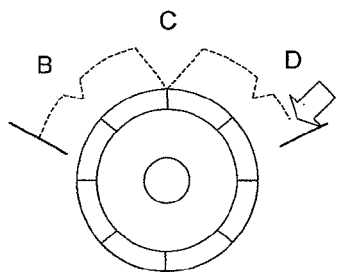

FIG. 9D depicts a compound virtual detent profile. In some embodiments, the magnitude and/or width of the vibrotactile feedback may be varied at each point. In such embodiments, a compound effect may include two or more effects such as barriers or detents. A compound effect may be related to the operational characteristics of a system. For example, a compound effect used in conjunction with a menu system may generate light intensity vibrotactile feedback while a menu is traversed within a subcategory, but generate heavier intensity vibrotactile feedback when larger categories of the menu are traversed. In one embodiment, a hill effect may be used as a user traverses contact names beginning with the same letter. When a new letter is reached, a hard stop effect may be used to indicate the new letter.

Figure 9E:
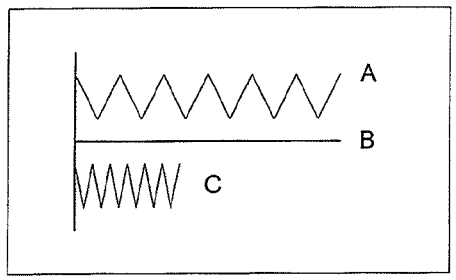
Figure 9E:
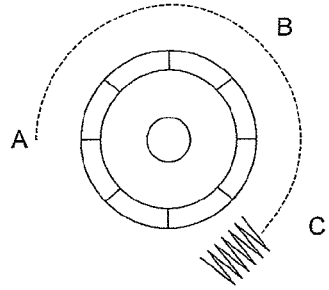

FIG. 9E depicts a spring virtual detent profile. A spring virtual detent may indicate a preferred position of an input device. For example, as a user manipulates a rotary knob away from a home position, a spring effect virtual detent may increase in intensity as the knobs distance from the home position increases.

Figure 9F:
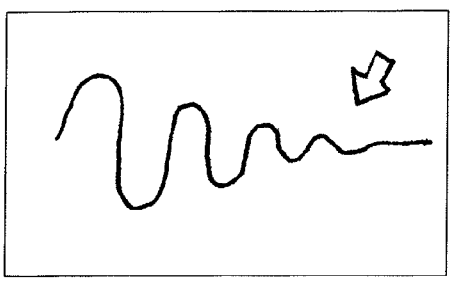
Figure 9F:
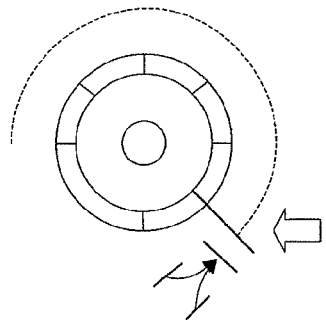

FIG. 9F depicts a damper virtual detent profile. In a damper virtual detent, the vibrotactile force may increase or decrease based on the speed of the manipulation of an input device. For example, a light vibrotactile effect may accompany slow rotation of a rotary knob, while a heavier vibrotactile effect may accompany faster rotation of the rotary knob.

Figure 9G:
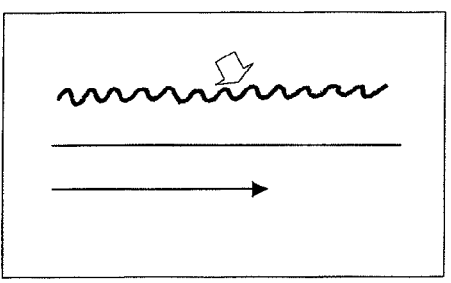
Figure 9G:
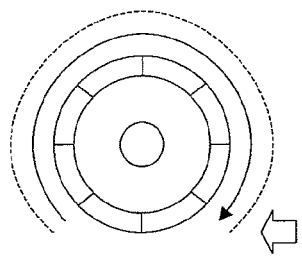

FIG. 9G depicts a constant virtual detent profile. A constant force effect may be a continuous force independent of the position or manipulation of the input device. For example, as a rotary knob is rotated, the force of the vibrotactile effect may remain constant. A constant virtual detent profile may be used in combination with a null force profile, such that vibrotactile effects are generated at a constant intensity during part of a manipulation of an input device, and not generated at all at a later time. For example, a constant vibrotactile force may be produced on a rotary knob until a threshold is reached, upon which no vibrotactile force is generated in response to manipulation of the rotary knob. In another example, a constant vibrotactile force may be output while a user has selected one item in a menu system, but not generated when a user selects a different item in a menu system.

Figure 9H:
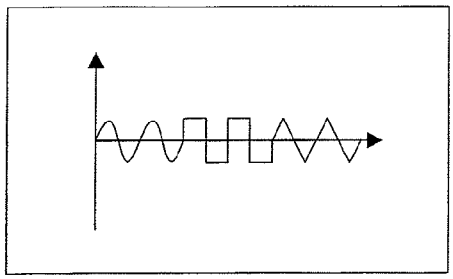
Figure 9H:
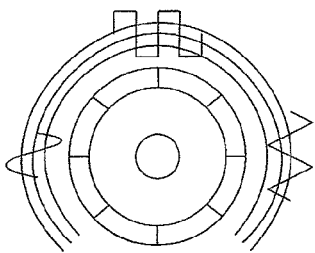

FIG. 9H depicts a periodic virtual detent profile. The periodic force effect profile may comprise a sine wave, square wave, or triangular wave profile. In one example of a triangular virtual detent, the intensity of a virtual detent may increase and decrease linearly over time. A periodic virtual detent may last for a set period of time.

General

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method comprising:
   receiving an input signal comprising information associated with a manipulation of an input device configured to control a plurality of systems, wherein the input device comprises a touch-pad;
   receiving a detent profile associated with one of the systems, the detent profile comprising haptic data associated with a virtual detent; and
   generating a vibrotactile signal configured to cause an actuator to produce a vibrotactile effect to the input device, the vibrotactile effect comprising the virtual detent.

2. The method of claim 1, further comprising generating a system signal associated with a system to be manipulated, the system signal based at least in part on the input signal, and wherein generating a system signal and generating the vibrotactile signal occur substantially simultaneously.

3. The method of claim 1, wherein the vibrotactile signal is based at least in part on the input signal.

4. The method of claim 1, wherein the vibrotactile signal is further based in part on the status of the input device.

5. The method of claim 1, further comprising determining whether to generate a vibrotactile signal.

6. The method of claim 5, wherein determining whether to generate a vibrotactile signal is based at least in part on a status of the system to be manipulated.

7. The method of claim 1, further comprising determining one of a plurality of virtual detents to generate.

8. The method of claim 1, wherein the detent profile comprises a first detent profile, and further comprising receiving a second detent profile.

9. A method comprising:
   detecting a change in position of an input device configured to control one of a plurality of systems, wherein the input device comprises a touch-pad;
   receiving a detent profile associated with one of the systems, the detent profile comprising haptic data associated with a virtual detent; and
   generating a detent signal based at least in part on the detent profile and the change in position, the detent signal configured to cause an actuator to produce a vibrotactile effect to the input device, the vibrotactile effect comprising the virtual detent, the vibrotactile effect based at least in part on the detent signal.

10. A non-transitory computer-readable medium on which is encoded program code, the program code comprising:
    program code for receiving an input signal comprising information associated with the manipulation of an input device configured to control one of a plurality of systems, wherein the input device comprises a touch-pad;
    program code for receiving a detent profile associated with one of the systems, the detent profile comprising haptic data associated with a virtual detent; and
    program code for generating a detent signal configured to cause an actuator to produce a vibrotactile effect to the input device, the vibrotactile effect comprising the virtual detent.

11. The computer-readable medium of claim 10, further comprising program code for generating a system signal associated with a system to be manipulated, the system signal based at least in part on the input signal.

12. The computer-readable medium of claim 10, further comprising program code for determining whether to generate a detent signal.

13. The computer-readable medium of claim 10, further comprising program code for determining a virtual detent to generate.

14. A non-transitory computer-readable medium on which is encoded program code, the program code comprising:
    program code for detecting a change in position of an input device configured to control one of a plurality of systems, wherein the input device comprises a touch-pad;
    program code for receiving a detent profile associated with one of the systems, the detent profile comprising haptic data associated with a virtual detent; and
    program code for generating a detent signal based at least in part on the change in position, the detent signal configured to cause an actuator to produce a vibrotactile effect to the input device, the vibrotactile effect comprising the virtual detent, the vibrotactile effect based at least in part on the detent signal.

15. A system comprising:
    an input device configured to control one of a plurality of systems, wherein the input device comprises a touch-pad;
    a processor in communication with the input device, the processor configured to receive an input signal and a detent profile associated with one of the systems, the detent profile comprising haptic data associated with a virtual detent, the processor further configured to generate a detent signal; and
    at least one actuator coupled to the input device, the at least one actuator configured to receive the detent signal and produce a vibrotactile effect to the input device, the vibrotactile effect comprising the virtual detent.

16. The system of claim 15, wherein the processor is further configured to control a system based at least in part on a manipulation of the input device.

17. The system of claim 15, wherein the processor is further configured to determine whether to generate a detent signal.

18. The system of claim 15, wherein the at least one actuator is coupled to a housing of the input device.

19. The system of claim 15, wherein the input device comprises a sensor.

* * * * *